US010795871B2

(12) United States Patent
Velayudhan Pillai et al.

(10) Patent No.: US 10,795,871 B2
(45) Date of Patent: Oct. 6, 2020

(54) KEY-VALUE STORES IMPLEMENTED USING FRAGMENTED LOG-STRUCTURED MERGE TREES

(71) Applicant: VMware, Inc., Palo Alto, CA (US)

(72) Inventors: Vijaychidambaram Velayudhan Pillai, Austin, TX (US); Ittai Abraham, Tel Aviv (IL)

(73) Assignee: VMware, Inc., Palo Alto, CA (US)

( * ) Notice: Subject to any disclaimer, the term of this patent is extended or adjusted under 35 U.S.C. 154(b) by 761 days.

(21) Appl. No.: 15/276,236

(22) Filed: Sep. 26, 2016

(65) Prior Publication Data
US 2018/0089244 A1 Mar. 29, 2018

(51) Int. Cl.
*G06F 16/00* (2019.01)
*G06F 16/22* (2019.01)
*G06F 16/23* (2019.01)

(52) U.S. Cl.
CPC ........ *G06F 16/2246* (2019.01); *G06F 16/221* (2019.01); *G06F 16/23* (2019.01)

(58) Field of Classification Search
None
See application file for complete search history.

(56) References Cited

U.S. PATENT DOCUMENTS

| 8,996,563 | B2* | 3/2015 | Bender | G06F 9/546 707/769 |
| 9,400,816 | B1* | 7/2016 | Gubarev | G06F 16/2474 |
| 9,710,377 | B1* | 7/2017 | Kuzmin | G06F 8/654 |
| 2013/0166568 | A1* | 6/2013 | Binkert | G06F 16/86 707/741 |
| 2014/0280375 | A1* | 9/2014 | Rawson | G06F 16/21 707/803 |
| 2017/0212680 | A1* | 7/2017 | Waghulde | G06F 16/185 |

OTHER PUBLICATIONS

Wang et al., "An Efficient Design and Implementation of LSM-Tree based Key-Value Store on Open Channel SSD," EuroSys '14 Proceedings of the Ninth European Conference on Computer Systems, Article No. 16, Apr. 14, 2014, 14 pages. (Year: 2014).*

* cited by examiner

*Primary Examiner* — Bai D Vu
(74) *Attorney, Agent, or Firm* — Patterson + Sheridan, LLP

(57) ABSTRACT

An example computer system includes a memory storing program code and a storage system storing at least a portion of a fragmented log-structured merge (FLSM) tree implementing a key-value store. The FLSM tree includes H levels, where H is an integer greater than one. The computer system further includes a central processing unit (CPU) configured to execute the program code stored in the memory to store a plurality of key-value pairs in the FLSM tree, the key value pairs having keys defined within a key space, the key space divided by a plurality of guards for each of the H levels of the FLSM tree, each of the key-value pairs being stored a maximum of H times in the FLSM tree.

21 Claims, 7 Drawing Sheets

KEY-VALUE STORES IMPLEMENTED USING FRAGMENTED LOG-STRUCTURED MERGE TREES

BACKGROUND

Key-value stores are widely deployed in various software applications and services and are an important part of modern storage infrastructure. Key-value stores are used, for example, to store metadata, configuration information, and the like. A well-designed key-value store has to satisfy two different performance goals. First, GET requests should be fast in that obtaining the value of a specific key should involve minimal read operations from storage. Second, PUT requests should be efficient and cause minimal write traffic to storage. These two requirements, however, are in conflict with each other.

For example, a key-value store can be implemented using a B-tree data structure. For the B-tree data structure, GET requests are fast. However, write costs are high, particularly for random writes. If the B-tree data structure uses copy-on-write, a single random write of one key-value pair may require writing many pages of underlying storage. This behavior, known as write amplification, lowers throughput and exacerbates wear-out for devices with limited lifetimes, such as solid state disks (SSDs). Thus, it is desirable to implement a key-value store using a data structure does not exhibit high write amplification.

DETAILED DESCRIPTION

Due to the high write cost of B-trees, key-value stores can use Log-Structured Merge trees (LSM trees). An LSM tree maintains key-value pairs in two or more separate structures, each of which can be optimized for its respective underlying storage medium. Compaction algorithms are used to synchronize the data between the two or more structures in batches. Using an LSM tree allows for fast, sequential writes at the cost of slightly slower reads with respect to a B-tree. To improve the performance of GET queries, LSM-based key-value stores can use an in-memory Bloom filter to identify the files on storage that may contain the target key and read only those files from the storage. However, Bloom filters are not sufficient to increase performance of range queries. In general, a range query is request for the value of some key that satisfies a condition with respect to a specified key. Example range queries include: return the value of the smallest key bigger than X; return the value of the largest key smaller than Y; and the like. Range queries are of important when implementing systems on top of key-value stores that require merging several streams of data (e.g., databases, file systems, and the like). For example, when running databases and file systems on top of key-value stores, range query performance can dominate the overall system performance.

This document describes techniques for providing key value stores implemented using Fragmented Log-Structure Merge trees (FLSM trees). An FLSM tree is a multi-level data structure that improves upon an LSM tree. The FLSM tree provides for efficient range queries, reading one log per level in the multi-level hierarchy. The FLSM tree reduces write amplification as compared to LSM trees. In particular, the FLSM tree can be compacted over time, which can result in rewriting key-value pairs. The FLSM tree allows for each key-value pair to be rewritten a maximum of H times, where H is the number of levels in the multi-level hierarchy. The FLSM tree is optimized for multiple random writes, instead of sequential writes. In an embodiment, a FLSM data structure is used to store key-value pairs for a key-value store. As opposed to an LSM data structure, the FLSM data structure provides low latencies for range queries, while minimizing write amplification and maintaining high write throughput. These and further aspects of FLSM trees are described below with respect to the drawings.

Figure 1:
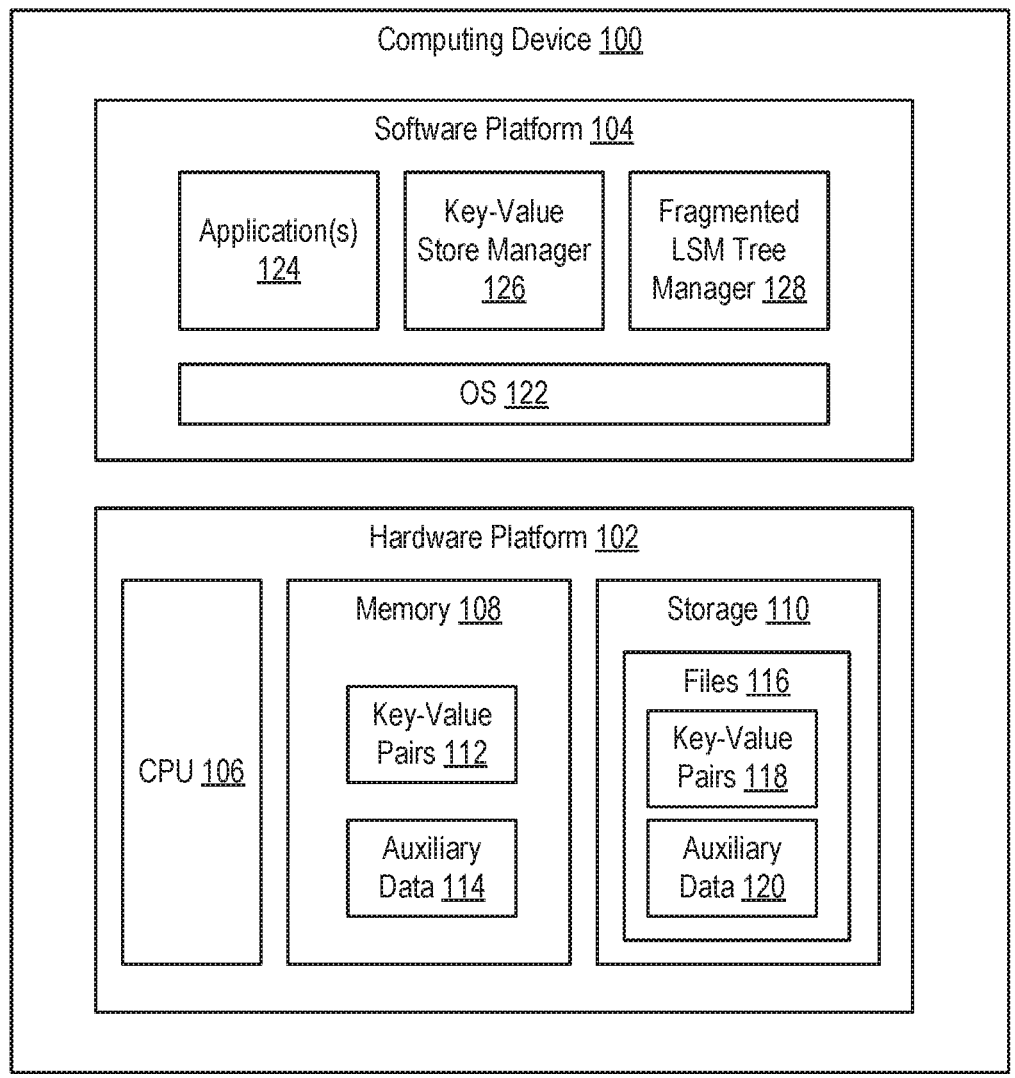
FIG. 1 is a block diagram of a computing device according to an embodiment.

FIG. 1 is a block diagram of a computing device 100 according to an embodiment. Computing device 100 includes a software platform 104 executing on a hardware platform 102. Hardware platform 102 includes a central processing units (CPU) 106, system memory 108 (also referred to as "memory 108"), and storage 110 (also referred to as "storage system 110"). CPU 106 is configured to execute instructions, for example, executable instructions that perform one or more operations described herein. Such executable instructions can be stored in memory 108 and/or in storage 110. Memory 108 includes devices allowing information, such as executable instructions and data, to be stored and retrieved. Memory 108 may include, for example, one or more random access memory (RAM) modules. Storage 110 includes local storage devices (e.g., one or more hard disks, flash memory modules, solid state disks, and optical disks) and/or storage interfaces to network data storage systems (not shown). Example network data storage systems include storage area networks (SANs), a network-attached storage (NAS), and the like. Hardware platform 102 is just one example hardware platform that can be used in embodiments described herein. In general, any hardware platform that includes at least a CPU, memory, and storage can be employed.

Software platform 104 includes an operating system (OS) 122, application(s) 124, key-value store manager 126, and FLSM tree manager 128. OS 122 executes on hardware platform 102 and provides an interface to hardware platform for application(s) 124, key-value store manager 126, and FLSM tree manager 128. OS 122 can be any commodity operating system known in the art, such as Linux®, Microsoft Windows®, Mac OS®, or the like. FLSM data structure manager 128 comprises software, executed by OS 122, which is configured to manage a FLSM tree that stores key-value pairs. Key-value store manager 126 comprises software, executed by OS 122, which is configured to manage a key-value store. Key-value store manager 126 cooperates with FLSM tree manager 128 to implement key-value store(s) using FLSM trees. Application(s) comprise software, executed by OS 122, which interact with key-value store manager 126 to add key-value pairs to key-value stores, query key-value stores, and the like. Application(s) can include database software, file system software, and the like. While three software modules are shown, the functions performed by the application(s) 124, key-value store manager 126, and FLSM tree manager 128 can be performed by one or more software modules.

Further, software platform 104 is just one example of a software platform that can be used in embodiments described herein. In another example, software platform can include a hypervisor or other virtualization software that abstracts processor, memory, storage, and networking resources of hardware platform 102 into multiple virtual machines (VMs) that run concurrently on computing device 100. VMs run on top of a hypervisor, which implements platform virtualization and enables sharing of the hardware resources of computing device 100 by the VMs. One example of a hypervisor that may be configured and used in embodiments described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized). Each VM supports execution of a guest operating system (OS) similar to the OS 122, as well as application(s) 124, key-value store manager 126, FLSM tree manager 128, or like type software modules.

The FLSM tree manager 128 generates and manages FLSM tree data structures ("FLSM tree"). Each FLSM tree includes a plurality of levels arranged in a hierarchy (e.g., Level 1, Level 2, Level 3, and so on). An FLSM tree stores key-value pairs. A key is some identifier, such as an integer, within a key space. The key space is the set of all possible keys. For example, if the key is a 32-bit integer, then the key space includes keys between 0 and $2^{32}-1$. A value is arbitrary data associated with a key. Each level includes one or more logs in which the key-value pairs are stored. The log(s) for one or more levels of an FLSM tree can be stored in memory 108 (e.g., key-value pairs 112), while the log(s) for one or more other levels are stored in storage 110 (e.g., key-value pairs 118). Alternatively, all of the logs for the FLSM tree can be stored in storage 110. Key-value pairs 118 are stored in files 116 of a file system implemented on storage 110. In an embodiment, each log of the FLSM tree stored on storage 110 comprises a file 116. FLSM tree manager 128 also maintains some auxiliary data associated with the FLSM tree, which can be stored in memory (e.g., auxiliary data 114), storage (e.g., auxiliary data 120 in file(s) 116), or both. Auxiliary data 120 can include metadata, tables, and the like associated with an FLSM tree. Example auxiliary data is described below.

The techniques for generating and using FLSM trees to implement key-value stores are described herein. Since FLSM trees can be compared with LSM trees, LSM trees are generally described herein. Writes in an LSM tree are first durably written to a log. When the log becomes full, the key-value pairs are read and then rewritten into the next level of the LSM hierarchy. When Level i becomes full, the level is compacted into Level i+1. Compaction can occur in the background while upper levels are being filled with data. Two techniques for compaction can be used and are referred to herein as level-based compaction and universal compaction.

In level-based compaction, each level contains a sequence of sorted files referred to as a run. Once Level i is full, the Level i is merge-sorted into Level i+1. In particular, both the old run of Level i and the old run of Level i+1 are streamed into memory and written back in new files to a new run in Level i+1. Once the new Level i+1 is complete, it becomes immutable and the old Level i and Level i+1 runs can be trimmed. In level-based compaction, compacting a single file in Level i may result in rewriting all the files in Level i+1. Since there can be many files in Level i, Level i+1 will be rewritten multiple times, leading to high write amplification. High write amplification decreases the usable lifetime of storage devices, such as SSD storage devices.

In universal compaction, each level contains B sorted runs, where each run is a sequence of files. Once Level i is full (e.g., once it has B full runs), universal compaction merge-sorts the B Level i runs into a new Level i+1 run. In particular, the B Level i runs are streamed in to memory and written back in new files to a new Level i+1 run. Once this is complete, the old Level i can be trimmed. Previous Level i+1 runs are not merged during this compaction and are not trimmed.

In general, level-based compaction exhibits better performance for reads and worse performance for writes as compared to universal compaction. In level-based compaction, each key-value pair could be written B times on each level (where B is the number of runs). Universal compaction increases read costs because it requires examination of B runs on each level. However, each key-value pair is written only once on each level. For exact match queries, both types of LSM trees can make use of in-memory Bloom filters to decide which runs should be searched. For range queries, however, Bloom filters cannot reduce read costs.

The FLSM tree can be compared to the LSM trees described above in terms of write and read costs. Write amplification, as used herein, is the amount of data written to storage divided by the total amount of input data. In an ideal key-value store, write amplification would be close to one, indicating that the data is not rewritten extensively. Notably, write amplification captures data that might be written and then later deleted, thus capturing input/output (IO) traffic for reorganizing data structures on storage. Another metric is the number of files read per range query. If a given file is read multiple times, it counts only once in this measure. Another metric is range query latency. This is the time taken to do a single range query for a valid key in the key space.

In an LSM tree that uses level-based compaction, better read performance is obtained due to Level i being entirely merge-sorted into Level i+1 at compaction time. However, such complete merge-sorting is not strictly necessary to achieve good read performance. Partial sorting can provide much of the benefit of sorting, while being significantly less expensive. The FLSM tree described herein takes advantage of such partial sorting of the key-value pairs.

In the FLSM tree, guards are embedded into each level of the hierarchy. This is achieved by dividing the key space into a plurality of guards for each of H levels of the FLSM tree, where H is greater than one. Guards are particular key values. In an embodiment, the guards are chosen in such a way that there will be an expected amount of data between two consecutive guards on the same level (e.g., K megabytes (MB) of data or K key-value pairs). In an embodiment, guards are randomly chosen from the key space for each level of the FLSM tree. In a non-limiting example, K=2 megabytes (MBs) of data, but other values of K can be used. On each level of the FLSM tree, each K MB log (referred to as a "guarded log") has a corresponding a guard and includes key-value pairs for a range of key space. The guarded log itself is not fully sorted, but includes a series of at most B sorted lists. Each sorted list of key-value pairs is referred to herein as a segment. The guards allow the FLSM tree to satisfy a range query by reading a single guarded log (e.g., file) per level.

Figure 2:
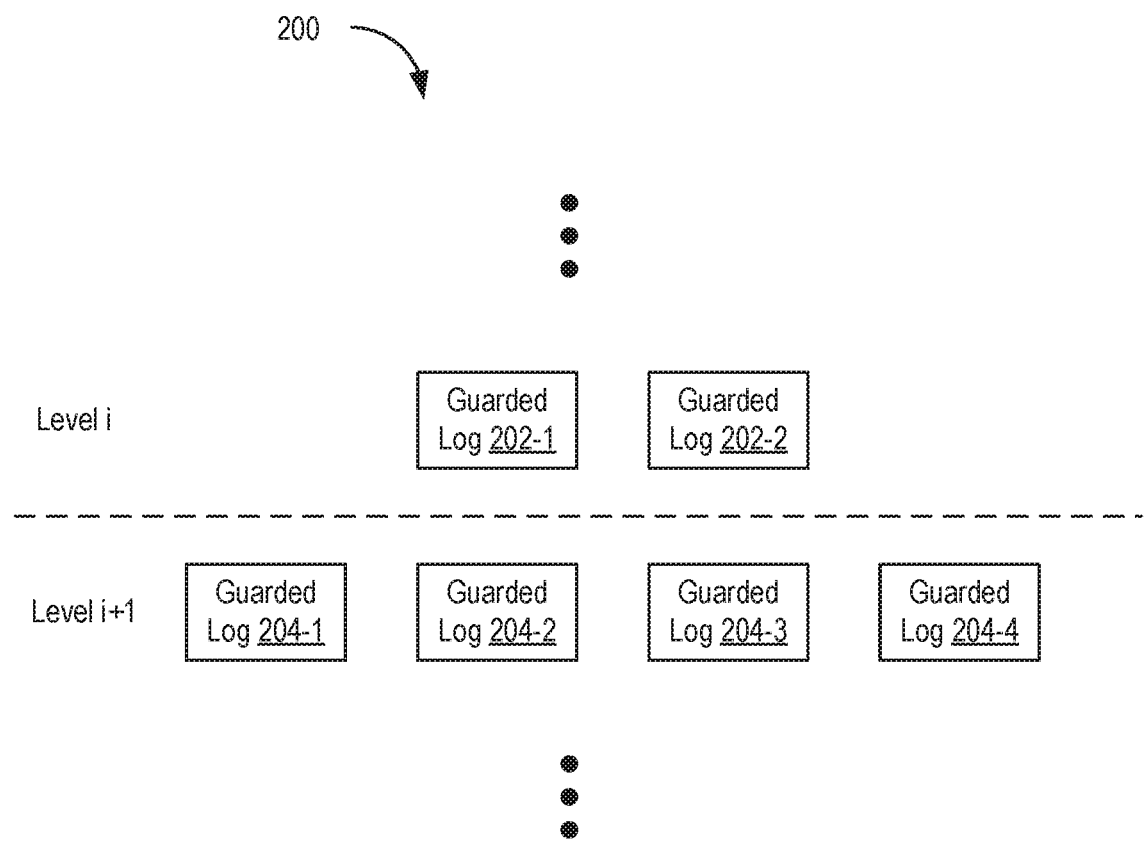
FIG. 2 is a block diagram depicting a fragmented log-structured merge (FLSM) tree according to an embodiment.

FIG. 2 is a block diagram depicting an FLSM tree 200 according to an embodiment. FLSM tree 200 includes a plurality of levels, of which a Level i and a Level i+1 are shown, where i is a positive integer. While only two levels are shown, FLSM tree 200 can include more than two levels (e.g., H levels, where H is greater than one). Each level of FLSM tree 200 includes one or more logs that store key-value pairs based on guards ("guard logs"). As shown, FLSM tree 200 includes guard logs 202-1 and 202-2 in Level i, and guard logs 204-1 through 204-4 in Level i+1. In general, a given level includes a number of guard logs equal to the number of guards assigned to the level. In an embodiment, the number of guards per level increases each level from the upper level to the lower level and thus the number of guard logs per level increases similarly.

Each log can have a certain size, such as K MBs, and each level can be specified to store a certain maximum amount of data (including key and value data). For example, Level 1 of an FLSM can be designed to store 10 MBs in five, 2 MB guard logs. A given level of FLSM tree 200 can be stored in memory or storage. For example, Level 1 of FLSM tree 200 can be stored in memory, and lower levels of FLSM tree 200 can be stored on storage. The lower levels can be further characterized based on types of storage (e.g., one or more levels can be stored on SSDs, while lower level(s) can be stored on hard disks). When on storage, a guarded log can be stored in a file of a file system implemented on the storage.

Figure 3:
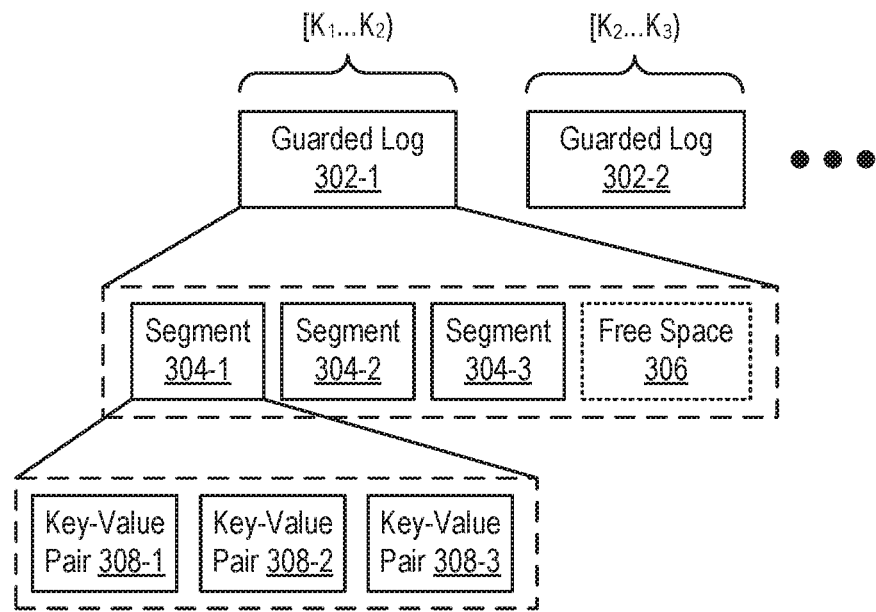
FIG. 3 is a block diagram depicting a level of an FLSM tree according to an embodiment.

FIG. 3 is a block diagram depicting a level 300 of an FLSM tree according to an embodiment. Level 300 includes one or more guard logs 302 (e.g., guard logs 302-1 and 302-2 are shown by example). Each guarded log 302 is constrained to store key-value pairs for a certain range of keys defined by consecutive guards. In the example, guarded log 302-1 is constrained to store key-value pairs for keys between $K_1$ and $K_2$. In the example, the key range for guarded log 302 is inclusive of $K_1$ and exclusive of $K_2$. Guarded log 302-2 is constrained to store key-value pairs for keys between $K_2$ (inclusive) and $K_3$ (exclusive). In this manner, the key space for a given key-value store can be divided into discrete portions for a given level of the FLSM tree, where each portion has an associated guarded log.

At a given time, each guarded log 302 stores zero or more segments 304. In the example, guarded log 302-1 includes segments 304-1, 304-2, and 304-3. Each segment 304 includes a sorted list of key-value pairs 308 (sorted based on key). In the example, segment 304-1 includes key-value pairs 308-1, 308-2, and 308-3. In an embodiment, each guarded log 302 is of a predefined size (e.g., K MBs). Thus, a given guarded log can have free space 306 available to store additional segment(s) as they are added to the key-value store. If the segments consume the entirety of a given guarded log, the guarded log is full. An example technique for compacting guard logs is described below.

The performance of the FLSM tree depends on how the guards are chosen, since skew in key distribution will lead to significantly slower reads. FLSM tree manager 128 can select guards as follows. Upon a key being inserted into the FLSM tree, FLSM tree manager 128 considers the key as a candidate for being a guard at each level. FLSM tree manager 128 determines the number of guards per level based on the amount of data to be stored at each level and the maximum size of a guarded log. In an embodiment, FLSM tree manager 128 selects the guards randomly from the key space. For example, assume a key space of 50 million keys. If guard logs have a maximum size of 2 MB, and if Level 1 of the FLSM tree stores a maximum of 10 MB, then Level 1 includes five guard logs. Each inserted key then has a probability of 5/50 million of being selected as a guard in Level 1 (e.g., the key space in Level 1 is divided into five portions). Assume Level 2 is configured to store 100 MB and thus includes 50 guard logs. In such case, each inserted key has a probability of 50/(50 million) of being selected as a guard in Level 2 (e.g., the key space in Level 2 is divided into 50 portions). If a key is chosen to be a guard in a given level, that key is also a guard in each lower level of the FLSM tree. Thus, the deeper the level, the higher the probability that a given key will be chosen as a guard. A user can configure FLSM tree manager 128 to establish the number of levels, the size of each level, and the size of each guard file. FLSM tree manager 128 can then select guards for each level of the FLSM tree hierarchy as set forth above.

Figure 4:
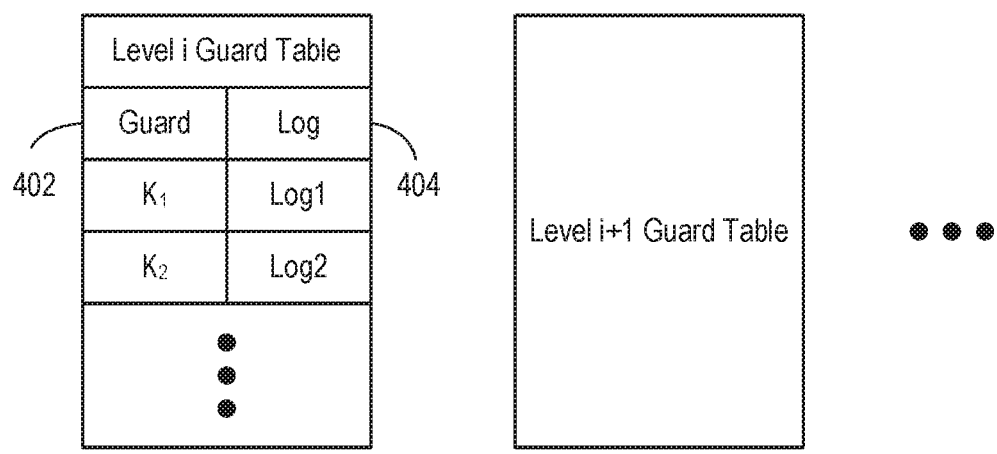
FIG. 4 is a block diagram depicting guard tables for levels of an FLSM tree according to an embodiment.

FIG. 4 is a block diagram depicting guard tables for levels of an FLSM tree according to an embodiment. Guard tables relate guards to guard logs and can be stored as auxiliary data associated with an FLSM tree (e.g., auxiliary data 114 and/or auxiliary data 120). FLSM tree manager 128 can generate a guard table for each level of the FLSM tree. In the example show, the guard table for Level i is shown in detail. Each guard table for other levels can be configured similarly. The guard table for Level i includes a column 302 of guards and a column 304 of log identifiers. In the example, a guard $K_1$ is associated with a guarded log "Log 1," and a guard $K_2$ is associated with a guarded log "Log 2." The log identifier can be a file name, memory address, file address, or the like that identifies a particular guarded log associated with the guard. As described above, each guard is a key value. A guard table can store entries for any number of guards, depending on the number of guards assigned to the particular level.

Figure 5:
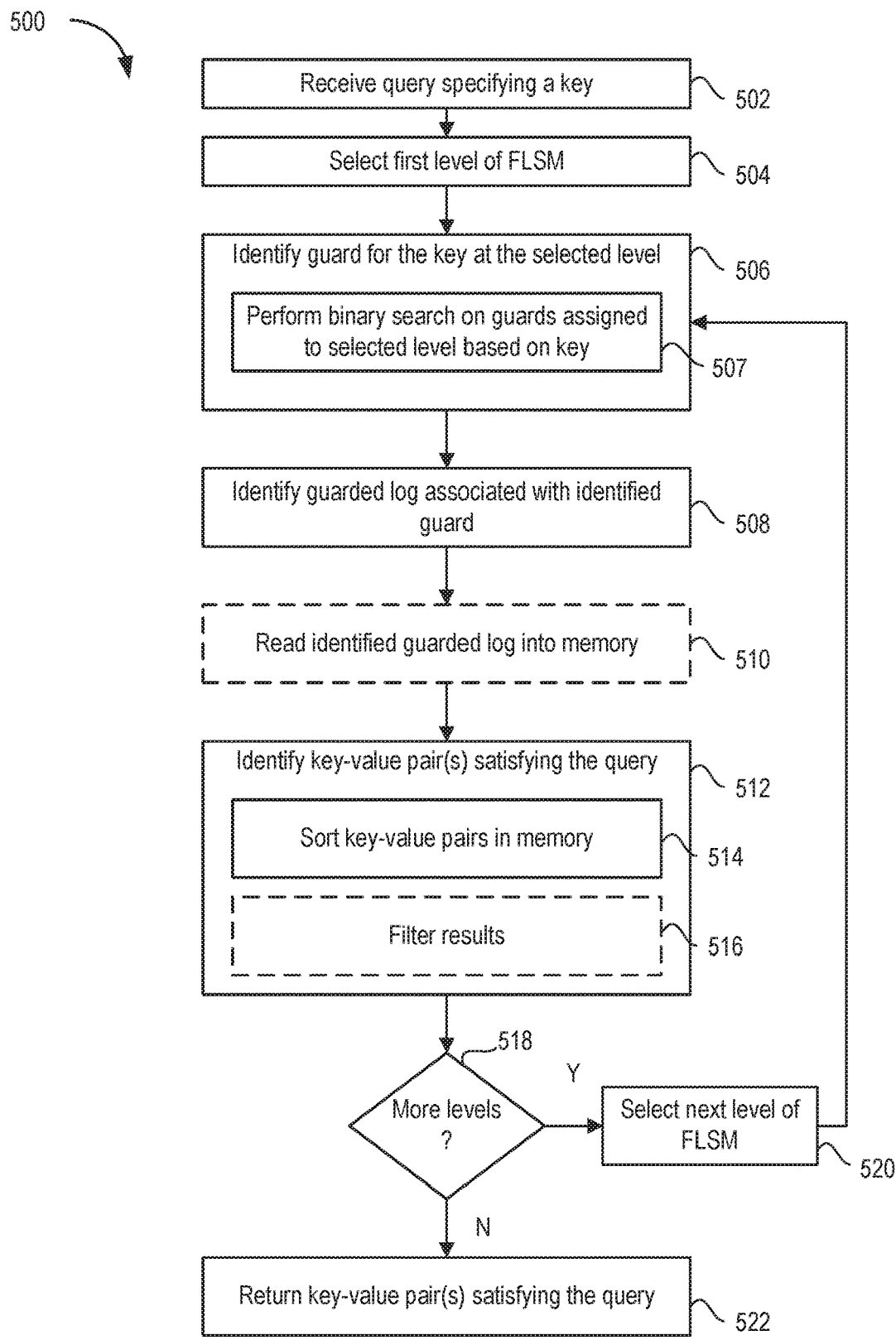
FIG. 5 is a flow diagram depicting a method of reading from a FLSM tree according to an embodiment.

FIG. 5 is a flow diagram depicting a method 500 of reading from a FLSM tree according to an embodiment. Method 500 can be performed by FLSM tree manager 128. Method 500 begins at step 502, where FLSM tree manager 128 receives a query specifying a key. The query can be an exact match query or range query. In case of a range query, the specified key also includes a particular condition (e.g., get the value of the smallest key bigger than key X).

At step 504, FLSM tree manager 128 selects the first level of the FLSM tree. At step 506, FLSM tree manager 128 identifies a guard for the key at the selected level. As described above, for each level, the key space is divided into portions, where each portion is starts with a guard. FLSM tree manager 128 can determine the guards from the guard table for the current level, as described above. In an embodiment, at step 507, FLSM tree manager 128 performs a binary search across the guards assigned to the current level using the key specified in the query as parametric input.

At step 508, FLSM tree manager 128 identifies a guarded log associated with the identified guard. FLSM tree manager 128 can determine the guarded log from the guard table for the current level. At step 510, if the guarded log is a file stored in the storage system, FLSM tree manager 128 reads the guarded log from storage 110 into memory 108. Otherwise, FLSM tree manager 128 accesses the guarded log in memory 108.

At step 512, FLSM tree manager 128 identifies key-value pair(s) satisfying the query. In an embodiment, at step 514, FLSM tree manager 128 sorts the key-value pairs obtained from the guarded log in memory. There is no requirement that the segments store unique keys. If a given key is stored multiple times across different segments, then FLSM tree manager 128 can identify multiple key-value pairs for the given query. In an embodiment, at step 516, FLSM tree manager 128 filters the returned key-value pairs. For example, multiple values can be retrieved for the same key. FLSM tree manager 128 can filter the values based on some auxiliary data, such as version information. FLSM tree manager 128 can obtain the auxiliary data from some external data structure or from the values themselves. Alternatively, FLSM tree manager 128 can return all identified key-value pairs that satisfy the query to key-value store manager 126, which then performs the filtering operation.

At step 518, FLSM tree manager 128 determines whether there are levels of the FLSM yet to be processed. If so, method 500 proceeds to step 520, where FLSM tree manager 128 selects the next level in the FLSM tree. Method 500 then returns to step 506 and repeats. If at step 518 there are no more levels to be processed, method 500 proceeds to step 522. At step 522, FLSM tree manager 128 returns one or more values for keys that satisfy the query as output.

Thus, as shown by method 500, the FLSM tree supports efficient GET queries, including both exact match GET queries and GET range queries. In general, the FLSM tree includes H pluralities of guard logs respectively associated with H pluralities of guards, where H is the number of levels in the hierarchy of the FLSM tree. Each GET query requires reading only H guard logs from the storage system. A range query includes performing a binary search on the guards of each of the levels, reading one guarded log for each level, sorting the key-value pairs for each retrieved guarded log in memory, and looking for the key-value pair(s) that satisfy the query. Assuming the binary search is done in memory, the cost of a range query is reading H guard logs (e.g., H files from storage 110). Accordingly, the FLSM tree minimizes read operations targeting the SSD while providing good read performance.

Figure 6:
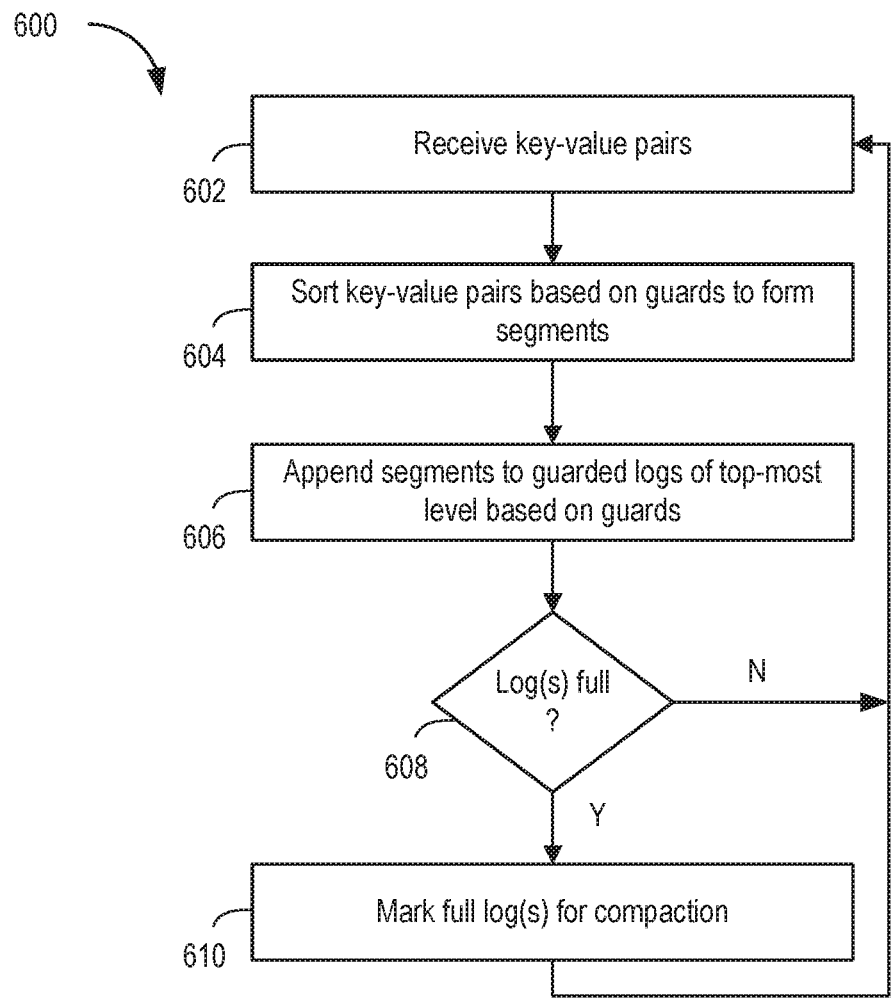
FIG. 6 is a flow diagram depicting a method of adding key-value pairs to an FLSM tree according to an embodiment.

FIG. 6 is a flow diagram depicting a method 600 of adding key-value pairs to an FLSM tree according to an embodiment. FLSM tree manager 128 can perform method 600 to update the FLSM tree implementing a key-value store given new key-value pairs to be inserted. Method 600 begins at step 602, where FLSM tree manager 128 receives the key-value pairs to be inserted into the FLSM tree. At step 604, FLSM tree manager 128 sorts the key-value pairs into segments based on guards assigned to the first level of the FLSM tree (e.g., the guards define "bins" into which the key-value pairs are sorted). The first level of the FLSM tree may be stored in either memory 108 or storage 110.

At step 606, FLSM tree manager 128 appends the segments to guard logs of the first level of the FLSM tree based on the guards. Any existing segments in the guard logs remain unmodified. Thus, each guarded log in the level is partially sorted. That is, each guarded log is fragmented into sorted segments, but the segments themselves are not sorted from one segment to the next. Each segment includes sorted key-value pairs that are bigger than or equal to the guarded log's guard and smaller than the next guard in the guard sequence.

At step 608, FLSM tree manager 128 determines if any of the guard logs are full. If not, method 600 returns to step 602 and repeats. Otherwise, method 600 proceeds to step 610, where FLSM tree manager 128 marks the full log(s) for compaction. A method for compacting an FLSM tree is described further below with respect to FIG. 7. Method 600 returns to step 602 from step 610 and repeats.

Figure 7:
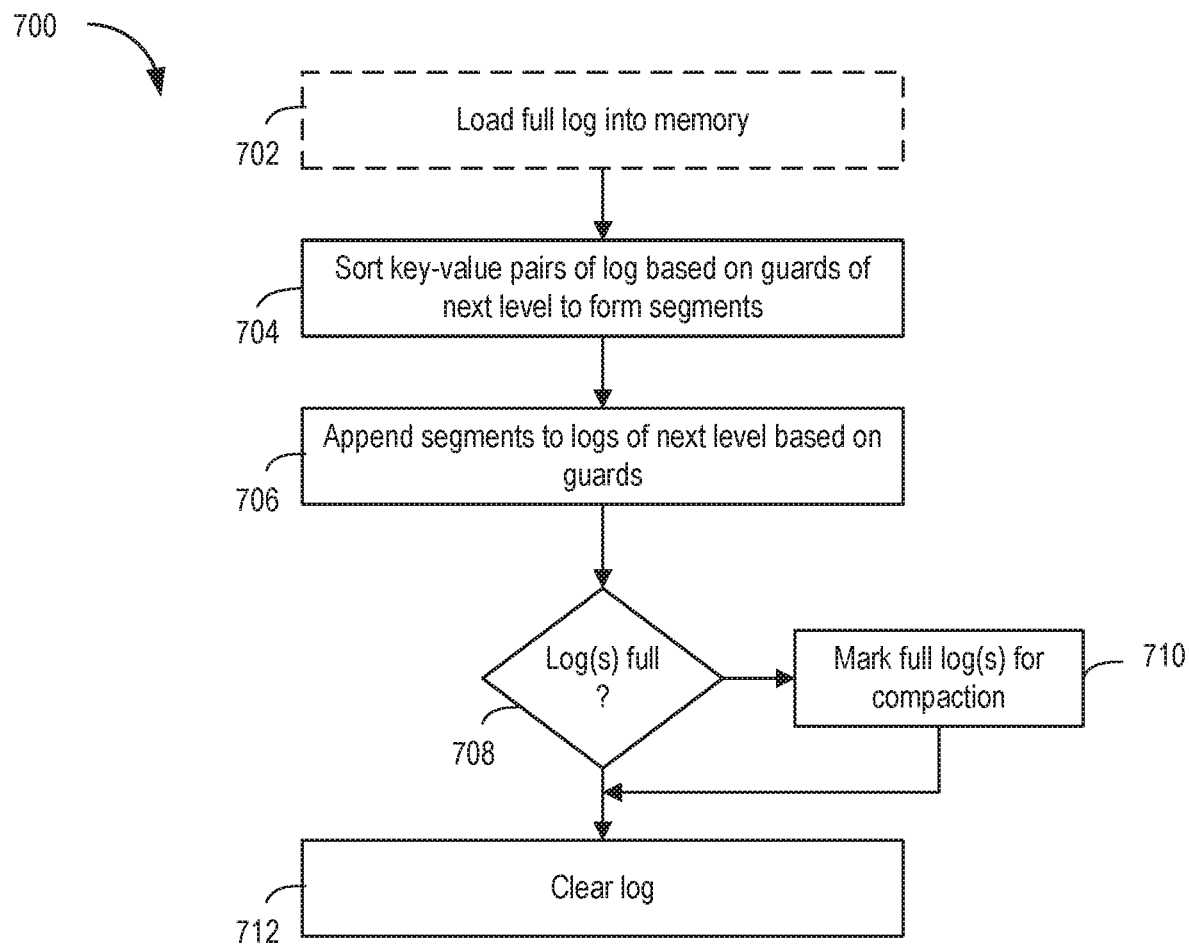
FIG. 7 is a flow diagram depicting a method of compacting an FLSM tree according to an embodiment.

FIG. 7 is a flow diagram depicting a method 700 of compacting an FLSM tree according to an embodiment. FLSM tree manager 128 can perform method 700 to update the FLSM tree implementing a key-value store in response to any full guard logs or periodically at any time. Method 700 begins at step 702, where the FLSM tree manager 128 loads a guarded log to be compacted into memory 108. If the guarded log is already in memory 108, method 700 can omit step 702.

At step 704, FLSM tree manager 128 sorts the key-value pairs obtained from the guarded log into segments based on the guards assigned to the next level of the FLSM tree. At step 706, FLSM tree manager 128 appends the segments to guard logs of the next level of the FLSM tree based on the guards for that level. Any existing segments in the guard logs remain unmodified. Each segment includes sorted key-value pairs that are bigger than or equal to the guarded log's guard and smaller than the next guard in the guard sequence.

At step 708, FLSM tree manager 128 determines if any guard logs in the next level are full. If not, method 700 returns to step 702 and repeats. Otherwise, method 700 proceeds to step 710, where FLSM tree manager 128 marks the full log(s) for compaction. Method 700 proceeds from step 710 to step 712. If there are no full guard logs, method 700 proceeds to step 712, where FLSM tree manager 128 clears the key-value pairs from the guarded log that has been compacted.

Any number of guard logs can be compacted using method 700. FLSM tree manger can perform compaction periodically or in response to some event, such as a determination that a guarded log is full. Further, FLSM tree manager 128 can execute method 700 in parallel to compact multiple guard logs at one time. Note that methods 600 and 700 perform similar steps. That is, the process of adding new key-value pairs to the FLSM tree and compacting are similar, with the exception of the source of the key-value pairs to be written to the next level.

By not merge-sorting like the level-based compacted LSM tree, the FLSM tree avoids significant write amplification. For the FLSM tree, each key-value pair is written a maximum of only once per level, rather than B times per level as in the level-based compacted LSM tree. By reducing write amplification, implementing a key-value store using an FLSM tree conserves storage resources that can wear out due to excessive writes, such as SSDs.

Figure 8A:
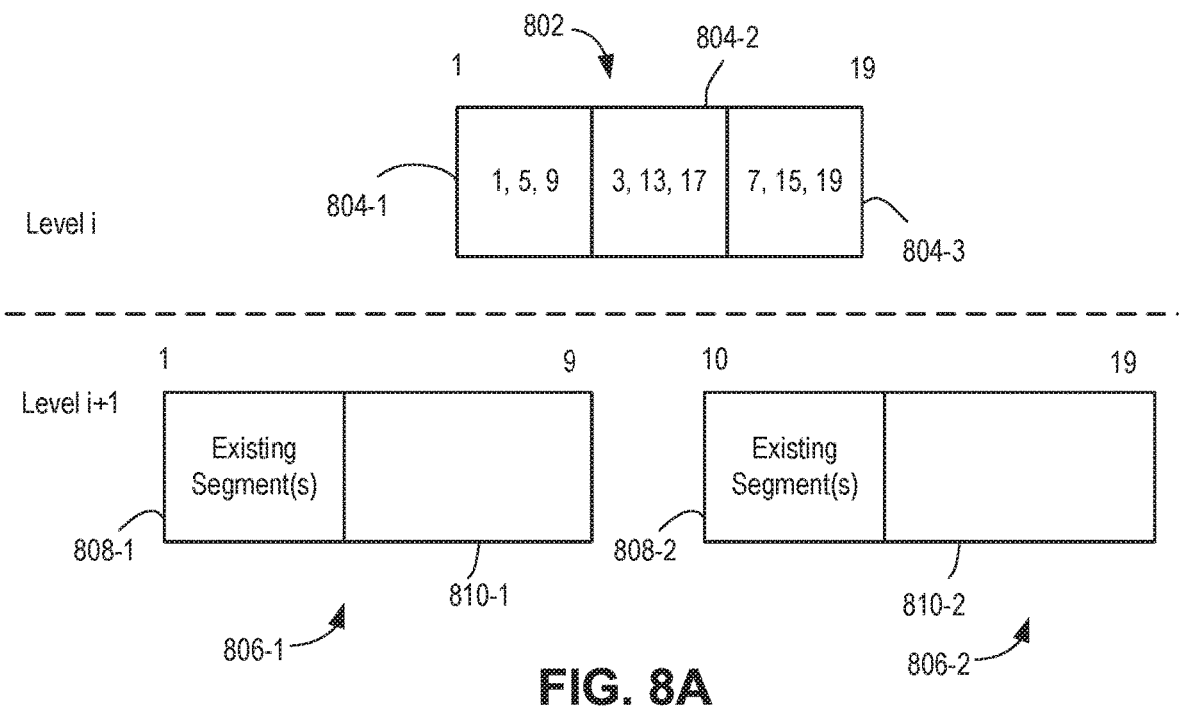
FIG. 8A is a block diagram depicting a portion of an FLSM tree before compaction according to an embodiment.

FIG. 8A is a block diagram depicting a portion of an FLSM tree before compaction according to an embodiment. A Level i includes a guarded log 802 having three segments 804-1, 804-2, and 804-3. Guarded log 802 is associated with a guard value of 1 and is configured to store all keys between 1 and 19. The segment 804-1 includes keys 1, 5, and 9; the segment 804-2 includes keys 3, 13, and 17; and the segment 804-3 includes keys 7, 15, and 19. The values associated with the keys are omitted for clarity. A Level i+1 includes guard logs 806-1 and 806-2. Guarded log 806-1 includes existing segment(s) 808-1, and guarded log 806-2 includes existing segments 808-2. Guarded log 806-1 includes free space 810-1, and guarded log 806-2 includes free space 810-2. Guarded log 806-1 is associated with a guard value of 1 and is configured to store all keys between 1 and 9. Guarded log 806-2 is associated with a guard value of 10 and is configured to store all keys between 10 and 19.

Figure 8B:
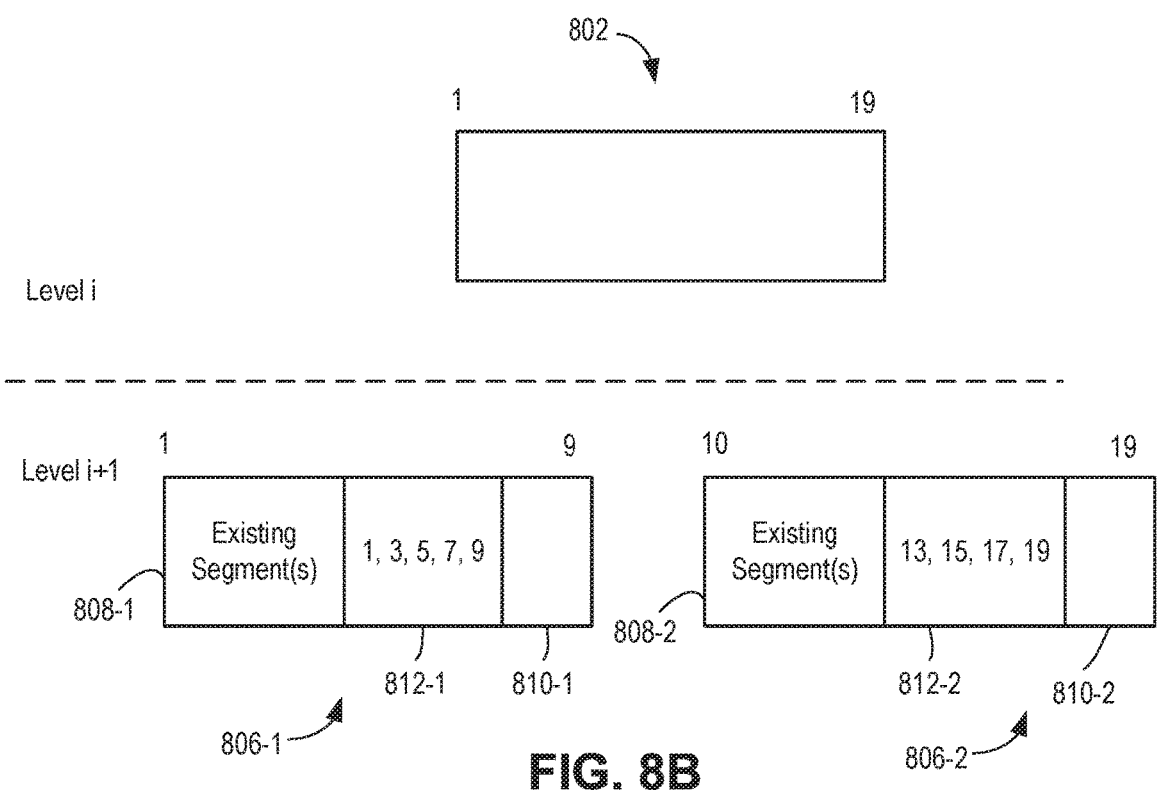
FIG. 8B is a block diagram depicting a portion of the FLSM tree after compaction according to an embodiment.

FIG. 8B is a block diagram depicting a portion of the FLSM tree after compaction according to an embodiment.

The Level i includes guarded log 802, which is now empty. Guarded log 806-1 of the Level i+1 includes a segment 812-1 appended to existing segments 808-1. Guarded log 806-2 of Level i+1 includes a segment 812-2 appended to existing segments 808-2. Segment 812-1 includes the keys 1, 3, 5, 7, and 9. Segment 812-2 includes the keys 13, 15, 17, and 19. As shown in the example, the keys previously in guarded log 802 are sorted among the guards of the Level i+1 and appended to the appropriate guard logs in the Level i+1.

Techniques for providing key value stores implemented using Fragmented Log-Structure Merge trees (FLSM trees) have been described. The FLSM tree is a novel data structure that allows for fast range queries without suffering from high write amplification. Implementing a key-value store using an FLSM tree provides significant improvements of the underlying computer technology. In particular, the low write amplification of the FLSM tree mitigates wear of storage resources, such as SSDs or like devices. Further, support of efficient range queries improves input/output (IO) between the CPU, the memory, and the storage devices. Further, use of FLSM trees can improve the software platform of a computing device, such as improving operation of key-value store software and any application software that makes use of key-value store software.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of updating a fragmented log-structured merge (FLSM) tree implementing a key-value store on a computer system having a central processing unit (CPU), a memory, and a storage system, the method comprising:
    obtaining a plurality of key-value pairs having keys defined within a key space, the key space divided by a plurality of guards for each of H levels of the FLSM tree, where H is an integer greater than one, wherein a number of the plurality of guards for each of the H levels of the FLSM tree varies in proportion to an amount of data to be stored in the storage system at such level;
    sorting, through execution of code by the CPU, the plurality of key-value pairs into one or more segments of sorted key-value pairs based on the plurality of guards of a target level of the H levels of the FLSM tree, wherein a first guard log of a plurality of guard logs of the target level comprises at least one segment of sorted key-value pairs; and
    appending, by writing to the storage system, each of the one or more segments to a different corresponding one of the plurality of guard logs of the target level of the FLSM tree without modifying any existing segments in the plurality of guard logs of the target level, wherein a first segment of the one or more segments is appended to the first guard log without modifying the at least one segment.

2. The method of claim 1, wherein the number of the plurality of guards in each of the H levels of the FLSM tree increases from one level to the next between an upper level and a lower level of the H levels of the FLSM tree.

3. The method of claim 1, wherein the step of obtaining comprises:
    loading a full guarded log from a level above the target level into the memory; and
    sorting key-value pairs stored in the full guarded log to generate the plurality of key-value pairs.

4. The method of claim 3, further comprising:
removing the plurality of key-value pairs from the full guarded log to produce an empty guarded log in the level above the target level.

5. The method of claim 1, wherein each of the plurality of guards for each of H levels of the FLSM tree comprises a key in the key space.

6. The method of claim 5, wherein, for each of the H levels of the FLSM tree, the respective plurality of guards is selected randomly from the key space.

7. The method of claim 1, further comprising:
receiving a query specifying a key in the key space;
reading H guard logs of the FLSM tree into the memory from the storage system based on a relation between the key and the plurality of guards for each of the H levels of the FLSM tree;
identifying, through execution of code by the CPU, at least one key-value pair in the H guard logs that satisfies the query; and
providing as output at least one value corresponding to the at least one key-value pair.

8. The method of claim 7, wherein the query is a range query that further specifies a condition associated with the key.

9. The method of claim 7, wherein the at least one key-value pair comprises a plurality of key-value pairs in the H guard logs that satisfy the query, wherein the at least one value provided as output comprises one value, and wherein the step of providing comprises:
filtering the plurality of values corresponding to the plurality of key-value pairs to identifying the one value provided as output.

10. The method of claim 1, further comprising:
determining the first guard log is full;
sorting all key-value pairs of all segments of the first guard log into second one or more segments of sorted key-value pairs based on the plurality of guards of a second target level of the H levels of the FLSM tree;
appending each of the second one or more segments to a different corresponding one of a second plurality of guard logs of the second target level of the FLSM tree without modifying any existing segments in the second plurality of guard logs of the second target level; and
clearing all the key-value pairs from the first guard log.

11. A non-transitory computer readable medium comprising instructions, which when executed in a computer system, causes the computer system to carry out a method of updating a fragmented log-structured merge (FLSM) tree implementing a key-value store on a computer system having a central processing unit (CPU), a memory, and a storage system, the method comprising:
obtaining a plurality of key-value pairs having keys defined within a key space, the key space divided by a plurality of guards for each of H levels of the FLSM tree, where H is an integer greater than one, wherein a number of the plurality of guards for each of the H levels of the FLSM tree varies in proportion to an amount of data to be stored in the storage system at such level;
sorting, through execution of code by the CPU, the plurality of key-value pairs into one or more segments of sorted key-value pairs based on the plurality of guards of a target level of the H levels of the FLSM tree, wherein a first guard log of a plurality of guard logs of the target level comprises at least one segment of sorted key-value pairs; and
appending, by writing to the storage system, each of the one or more segments to a different corresponding one of the plurality of guard logs of the target level of the FLSM tree without modifying any existing segments in the plurality of guard logs of the target level, wherein a first segment of the one or more segments is appended to the first guard log without modifying the at least one segment.

12. The non-transitory computer readable medium of claim 11, wherein the number of the plurality of guards in each of the H levels of the FLSM tree increases from one level to the next between an upper level and a lower level of the H levels of the FLSM tree.

13. The non-transitory computer readable medium of claim 11, wherein the step of obtaining comprises:
loading a full guarded log from a level above the target level into the memory; and
sorting key-value pairs stored in the full guarded log to generate the plurality of key-value pairs.

14. The non-transitory computer readable medium of claim 13, further comprising:
removing the plurality of key-value pairs from the full guarded log to produce an empty guarded log in the level above the target level.

15. The non-transitory computer readable medium of claim 11, further comprising:
receiving a query specifying a key in the key space;
reading H guard logs of the FLSM tree into the memory from the storage system based on a relation between the key and the plurality of guards for each of the H levels of the FLSM tree;
identifying, through execution of code by the CPU, at least one key-value pair in the H guard logs that satisfies the query; and
providing as output at least one value corresponding to the at least one key-value pair.

16. The non-transitory computer readable medium of claim 15, wherein the query is a range query that further specifies a condition associated with the key.

17. A computer system, comprising:
a memory storing program code;
a storage system storing at least a portion of a fragmented log-structured merge (FLSM) tree implementing a key-value store, the FLSM tree including H levels, where H is an integer greater than one, wherein a number of a plurality of guards dividing a key space for each of the H levels of the FLSM tree varies in proportion to an amount of data to be stored in the storage system at such level; and
a central processing unit (CPU) configured to execute the program code stored in the memory to store a plurality of key-value pairs in the FLSM tree, the plurality of key-value pairs having keys defined within the key space, each of the key-value pairs being stored a maximum of H times in the FLSM tree, by:
sorting the plurality of key-value pairs into one or more segments of sorted key-value pairs based on the plurality of guards of a target level of the H levels of the FLSM tree, wherein a first guard log of a plurality of guard logs of the target level comprises at least one segment of sorted key-value pairs; and
appending, by writing to the storage system, each of the one or more segments to a different corresponding one of the plurality of guard logs of the target level of the FLSM tree without modifying any existing segments in the plurality of guard logs of the target level, wherein a first segment of the one or more segments is appended to the first guard log without modifying the at least one segment.

18. The computer system of claim 17, wherein the CPU is configured to execute the program code to store each of the plurality of key-value pairs in a guarded log in H pluralities of guard logs corresponding to the H levels of the FLSM tree.

19. The computer system of claim 18, wherein the number of the plurality of guards in each of the H levels of the FLSM tree increases from one level to the next between an upper level and a lower level of the H levels of the FLSM tree.

20. The computer system of claim 18, wherein each of the plurality of guards for each of H levels of the FLSM tree comprises a key in the key space.

21. The computer system of claim 20, wherein, for each of the H levels of the FLSM tree, the respective plurality of guards is selected randomly from the key space.

* * * * *